(12) United States Patent
McGirr et al.

(10) Patent No.: US 12,726,278 B1
(45) Date of Patent: Sep. 1, 2026

(54) LASER-INDUCED ARTIFICIAL IONOSPHERE COMMUNICATIONS

(71) Applicant: SPAWAR Systems Center Pacific, San Diego, CA (US)

(72) Inventors: Scott C. McGirr, San Diego, CA (US); Ronald J. Wroblewski, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 3344 days.

(21) Appl. No.: 14/998,826

(22) Filed: Mar. 26, 2016

(51) Int. Cl.
*H04B 10/85* (2013.01)

(52) U.S. Cl.
CPC .................................... *H04B 10/85* (2013.01)

(58) Field of Classification Search
USPC ........................................................ 398/39
See application file for complete search history.

(56) References Cited

U.S. PATENT DOCUMENTS 4,686,605 A 8/1987 Eastlund
5,041,834 A 8/1991 Koert
5,148,129 A * 9/1992 Bolton ................... H03K 5/065 315/39
6,087,992 A * 7/2000 Anderson ............. H01Q 1/366 250/282
6,087,993 A * 7/2000 Anderson ............... H01Q 1/34 343/701
6,650,297 B2 * 11/2003 Anderson ................ H01Q 1/26 333/99 PL
6,966,235 B1 * 11/2005 Paton .................. G01D 11/245 29/407.05
2003/0193435 A1 * 10/2003 Anderson ................ H01Q 1/26 343/701
2005/0122272 A1 * 6/2005 Pellet ...................... H01Q 1/34 343/721
2005/0269996 A1 * 12/2005 Brennan ................ H02N 1/002 320/166
2006/0006015 A1 * 1/2006 Brennan ................... F03H 1/00 180/200
2006/0022641 A1 * 2/2006 Brennan ........... H01J 37/32339 320/128
2011/0102961 A1 * 5/2011 Lane ......................... H05F 7/00 361/212
2014/0053914 A1 * 2/2014 Kremeyer ............... B64C 23/04 137/13

(Continued)

FOREIGN PATENT DOCUMENTS

CN 1407348 A 5/2011

OTHER PUBLICATIONS

Unpublished, pending U.S. Appl. No. 13/987,249, filed Jan. 13, 2014, titled "Laser Induced Artificial Ionosphere Radar", Navy Case 101822.

(Continued)

*Primary Examiner* — James R Hulka
(74) *Attorney, Agent, or Firm* — Naval Information Warfare Center, Pacific; Kyle Eppele; J. Eric Anderson

(57) ABSTRACT

A method comprising the steps of: using laser pulses to produce a surface pattern of ionization filaments that serve as a first ion plasma reflector in open air at a first location; and reflecting radio frequency (RF) signals off of the first ion plasma reflector.

19 Claims, 12 Drawing Sheets

(56) References Cited

U.S. PATENT DOCUMENTS

2014/0185180 A1* 7/2014 Lane .......................... H05F 7/00 361/231
2016/0029467 A1* 1/2016 Lane .......................... H05F 7/00 361/231

OTHER PUBLICATIONS

Michael P. Kleiman; AFRL experiment will create artificial ionosphere; Internet, available at http://www.kirtland.af.mil/news/story.asp?id=123310746; last accessed Dec. 3, 2015.
A. Couairon and A. Mysyrowicz; Self-focusing and filamentation of femtosecond pulses in air and condensed matter: simulations and experiments; Topics in Applied Physics, vol. 114; pp. 297-322; 2005.
G. Méchain, A. Mysyrowicz, M. Depiesse, M. Pellet; A virtual antenna produced in air by intense femtosecond laser pulses; Proc. of SPIE vol. 5989, 59890S, (2005).
Naval Research Laboratory; Scientists produce densest artificial ionospheric plasma clouds; Physics / Plasma Physics; Feb. 25, 2013, available online at http://phys.org/print281013720.html; last accessed Dec. 3, 2015.
Couairon, A. et al., Femtosecond Filamentation in Transparent Media, Physics Reports, vol. 441, 2007, pp. 47-189, Elsevier, France.
Zhou, B. et al., Revival of Femtosecond Laser Plasma Filaments in Air by a Nanosecond Laser, Optics Express 17, 14, 11450 (2009).
Bree, C. et al., Self-Pinching of Pulsed Laser Beams During Filamentary Propagation, Optics Express, vol. 17, No. 19, pp. 16429-16435 (2009).
Akozbek, N. et al., Propagation and Filamentation of Femtosecond Laser Pulses in Optical Media, Laser Physics, vol. 15, No. 4, pp. 607-615 (2005).

* cited by examiner

LASER-INDUCED ARTIFICIAL IONOSPHERE COMMUNICATIONS

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, CA, 92152; voice (619) 553-5118; ssc_pac_t2@navy.mil. Reference Navy Case Number 102329.

BACKGROUND OF THE INVENTION

In the past, the ionosphere has been used to bounce radio frequency (RF) signals back down to ground. This phenomenon can be used to increase the range of radio communications beyond line-of-sight (LOS). However, the properties of the ionosphere are not consistent as it alters periodically due to changing atmospheric conditions. The ionosphere is useful only at very long-ranges and gives no mid-range coverage between it and LOS. Accordingly, there is a need for an improved long-range communication method.

SUMMARY

Disclosed herein is a method that comprises the following steps. The first step provides for using laser pulses to produce a surface pattern of ionization filaments that serve as a first ion plasma reflector in open air at a first location. The next step provides for reflecting radio frequency (RF) signals off of the first ion plasma reflector.

The disclosed method may also be described as a method comprising the following steps. The first step provides for using a first laser array to generate a first series of femtosecond laser pulses such that each laser pulse creates an ionization filament according to the Kerr effect in open air. The next step provides for aiming the first laser array such that the ionization filaments form a first ion plasma reflector in open air at a first location such that the first ion plasma reflector has a free-electron density of approximately $10^{15}/\text{cm}^3$. The next step provides for reflecting high frequency radio frequency (RF) signals off of the first ion plasma reflector. The next step provides for receiving the reflected RF signals with a first receiver.

BRIEF DESCRIPTION OF THE DRAWINGS

Throughout the several views, like elements are referenced using like references. The elements in the figures are not drawn to scale and some dimensions and/or angles are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1A:
FIG. 1A is a flowchart.
Figure 1A:
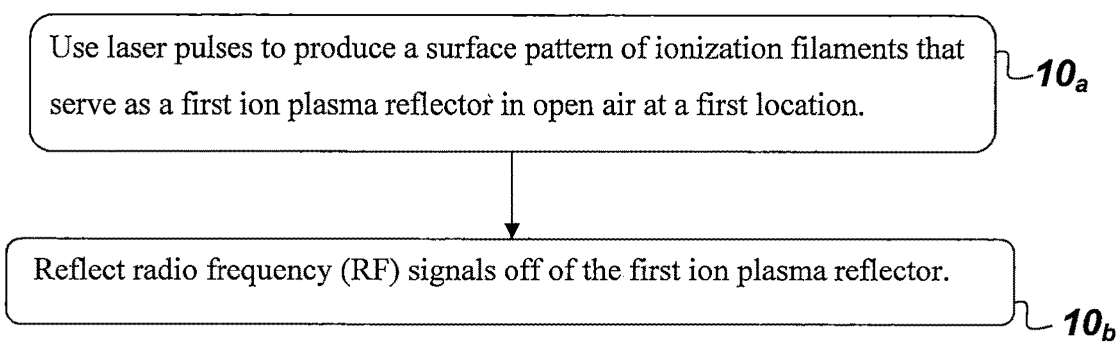

FIG. 1A is a flowchart of an embodiment of a laser-induced artificial ionosphere communication method 10 that comprises, consists of, or consists essentially of the following steps. The first step $\mathbf{10}^a$ provides for using laser pulses to produce a surface pattern of ionization filaments that serve as a first ion plasma reflector in open air at a first location. The next step $\mathbf{10}_b$ provides for reflecting radio frequency (RF) signals off of the first ion plasma reflector. Pulsed lasers may be used to produce a transient line of ionization filament in the atmosphere. The transient ionization filament may be refreshed with additional pulses. The energy to refresh a filament is lower than that required to initiate a filament. Additionally, dithering the orientation of the line and/or using multiple lasers may be used to establish an effective plane of ionization out of many lines (filaments).

Figure 1B:
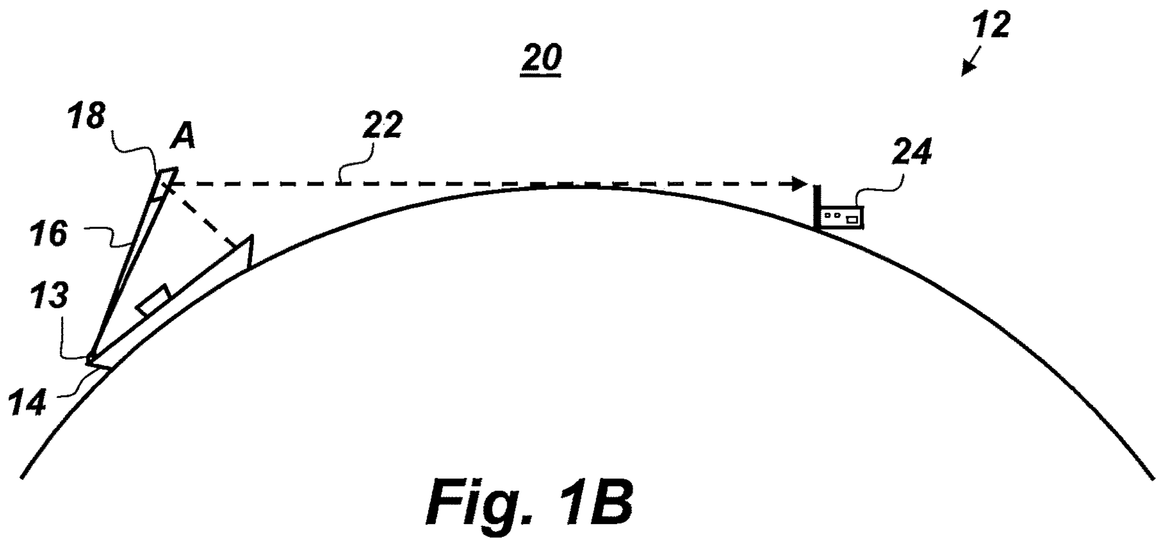
FIG. 1B is a side-view illustration of an example operational environment.

FIG. 1B is an illustration of an example operational environment 12 in which an embodiment of method 10 may be used. In environment 12, a first laser 13 that is mounted on a mobile platform 14 generates laser pulses 16 to produce a first ion plasma reflector 18 in open air 20 at a first location A. The laser pulses 16 may be generated at the laser-seed level. A pulse may be started with an analog or digital trigger. For example, a pulse may be started with an analog crystal oscillator. Afterwards the pulse goes through various amplification stages. The pulse may then be synchronized with the discharge of stored energy in order to be amplified. A single laser could perform all the needed pulses. Any manner (mechanical or electronic) of dithering/splitting the beam may be used to generate the first reflector 18. Alternatively, multiple lasers may be used achieve a filament surface such as the first reflector 18. In the operational environment 12 depicted in FIG. 1B, radio frequency (RF) signals 22 may originate from the mobile platform 14 and reflect off of the first ion plasma reflector 18. The reflected RF signals 22 may then be received with a receiver 24 at a location beyond the line of sight (LOS) of the mobile platform 14. In the operational environment 12 depicted in FIG. 1B, the receiver 24 is located beyond the horizon from the mobile platform 14. Method 10 enables the formation of a laser-induced artificial ionosphere communication system. An atmospheric reflector enables increased communication range beyond LOS. Even though in FIG. 1B, the RF signals 22 and the laser pulses 16 originate from the mobile platform 14, it is to be understood that the laser pulses and RF signals may originate from separate platforms. (e.g., See FIG. 5)

Figure 2:
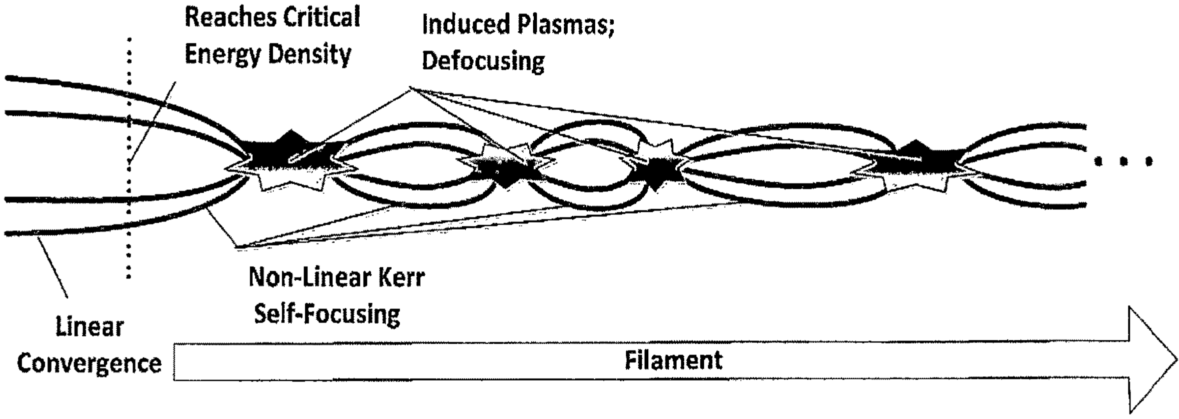
FIG. 2 is an illustration depicting atmospheric filamentation.

FIG. 2 is an illustration depicting atmospheric filamentation driven by high-power femtosecond (fs) lasers. Filaments are long lines of ionization. A filament starts when the critical energy density is reached. Where this happens can be controlled by grossly focusing the laser beam. This could be any distance from the business end of the laser. In practice, distances of at least 2 km from the end have been achieved. As laser pulses get shorter and shorter, the general trend is that they propagate shorter distances in the atmosphere due to increasing dispersion effects. However, this trend can become dramatically reversed as the pulse lengths approach fs levels. The reason for this is a pair of opposing non-linear effects. As pulses become shorter while maintaining a constant energy per pulse, higher and higher energy densities can be created within the pulses. At fs level pulses, a critical energy density can be reached, which can trigger an atmospheric Kerr Effect. A Kerr Effect is a second-order term of electromagnetic (EM) amplitude in the index-of-refraction expansion. Once the critical energy density is reached, the index of refraction starts increasing, causing the beam to start self-focusing. The beam width becomes dramatically smaller over a short propagation distance and the energy density dramatically increases.

Eventually, the energy density can become so high that the atmosphere spontaneously starts ionizing. Significant ionization-occurs in this region via non-linear effects, and the atmosphere can even become fully ionized in a small volume. The presence of this copious ionization acts as a defocusing agent upon the beam. The beam then spreads as it propagates until there is not enough energy density to induce the cascading ionization events. However, the energy density is still greater than the Kerr critical density, so the beam starts self-focusing once again. This sequence of self-propagating events can continue for significant distances. FIG. 2 depicts an illustration of this sequence.

Typical fs lasers can induce filaments with just milli-Joules (mJ) per pulse. These filaments can be expected to be stable over at least hundreds of meters. Also, by slowly converging the beam, filamentation can be induced as much as two kilometers (2 km) from the laser. Often, multiple filaments can be produced from a single beam. Furthermore, filament persistence can be achieved at lower energy levels. This can be accomplished relatively easily by using an ultraviolet (UV) laser, but it should be appreciated that a laser using any wavelength and the femtosecond pulsing scheme could be used. The persistence of the filament is addressed with the chart shown in FIG. 3. A filament may be expected to persist for about a microsecond or two. This is many orders of magnitude longer than the femtosecond creation time. But to achieve a significant duty cycle, the filament will need to be refreshed at nearly a MHz scale. The length of the filament is indeterminate at this point. Filaments of 200 m or more have been observed in open atmosphere; generally much longer than can be measured under controlled conditions. The length of the reflector 10 is determined by when the beam attenuates sufficiently such that the critical energy density can't be reached. As an energy-dense beam seems to have an affinity to branch into multiple filaments, there may be a practical limit to the length of a filament, but it's certainly >200 m.

The induced ionization may vary over four orders of magnitude ($10^{14}$ $e^-$/cc to $10^{18}$ $e^-$/cc, or electrons per cubic centimeter of atmosphere). The measured characteristic decay time (the time the atmosphere remains sufficiently ionized) can be about 140 nanoseconds (ns), which is more robust than the lifetime of a single free electron in the atmosphere (11 ns). These ionization densities can be significantly in excess of the naturally occurring ionizations in the ionosphere $\mathbf{10^4}$ $e^-$/cc to $10^6$ $e^-$/cc, and can reflect much higher frequency RF (including RF in the microwave regions). Localized plasmas in the lower atmosphere may explosively expand and quickly recombine.

Figure 3:
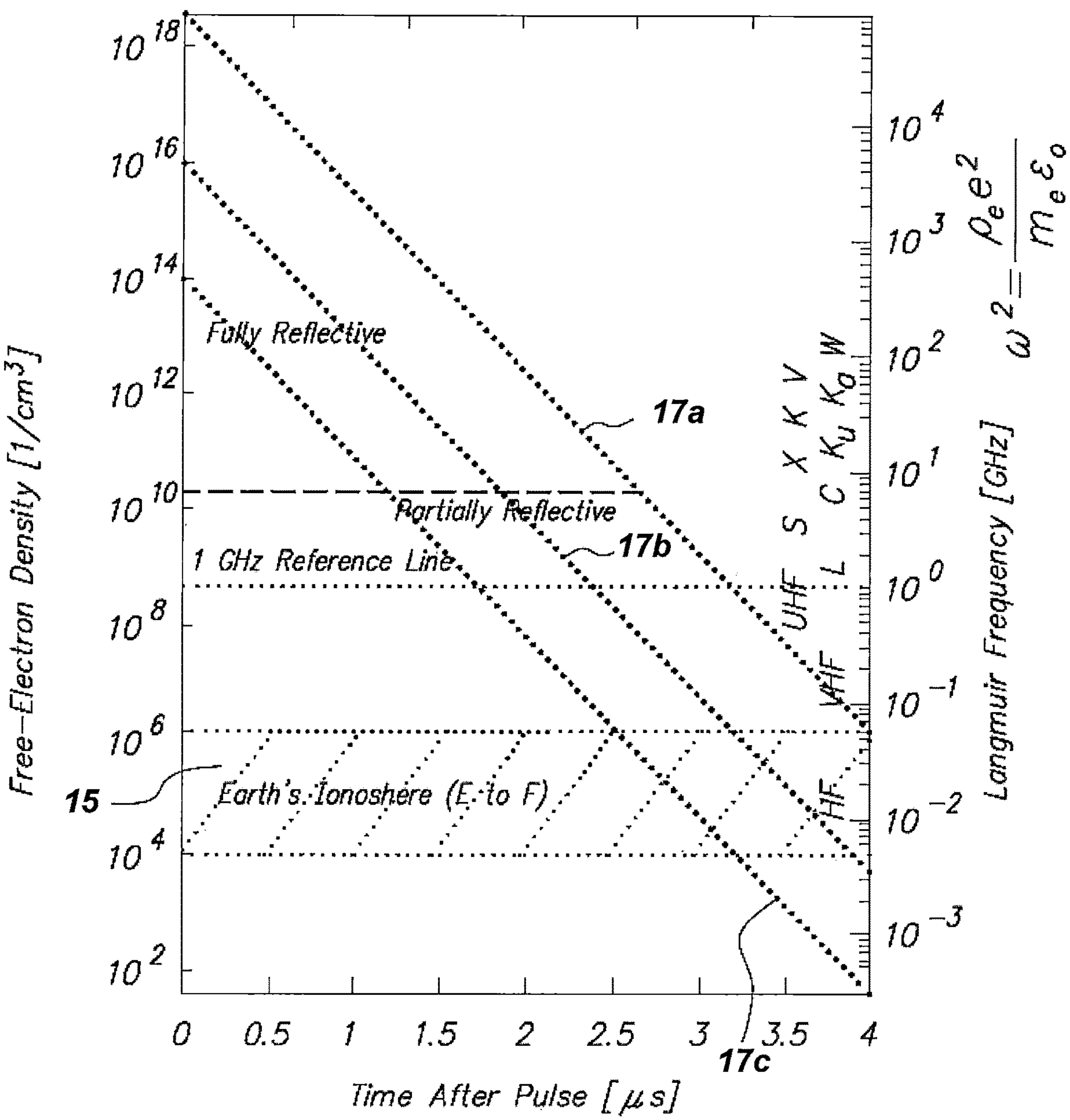
FIG. 3 is a graph showing electron density values versus time after pulse.

FIG. 3 is a graph showing the degree of ionization (expressed in terms of electron density) and frequency versus pulse characteristics (time after pulse). In FIG. 3, the axis to the left is the density of the free electrons in # per cc. It is a log scale and spans 16 orders of magnitude. The Earth's main ionosphere layers, E and F, region 15 in the graph, can be in the $10^4$ $e^-$/cc to $10^6$ $e^-$/cc realm. The three decaying lines 17*a*, 17*b*, and 17*c* in FIG. 3 can be the simple exponential decays starting from observed high, "typical" and low densities for filaments. The alternate scale on the right of FIG. 3 can be the Langmuir frequency for plasmas, or the upper frequency of EM energy that will react with the plasma. For the Langmuir frequency $\omega$ formula shown on the right hand side axis in FIG. 3, $\rho_e$ is the free electron density, e is the electron charge, $m_e$ is the electron mass and $\varepsilon_0$ is the electric constant (permittivity) of vacuum. The rough center of various named bands (UHF, C, Ku, etc.) can also be annotated on this axis for reference.

The lower x axis for FIG. 3 can be the time after the laser pulse in microseconds. Plotting the various observed densities, it can be seen that the design-point duration after pulse where the atmosphere is sufficient ionized so that the atmosphere is fully ionized in the frequency range of interest is about 2 to 3 microseconds. Note that this time after the pulse can imply that the induced ionization persists 10 million to a billion times longer than the actual pulse that created it. From FIG. 3, it can be seen that the femtosecond lasers can be pulsed to establish transient free electron plasmas at densities many orders of magnitude greater than the real ionosphere. And although the artificially induced ionosphere has a plasma decay that can be faster than the decay in the upper atmosphere, the transient plasma filament can still linger many orders of magnitude longer than the femtosecond pulse that created them, in part due to ionization cascade events described above.

System-level energy requirements will depend heavily upon needed refresh rates and the needed number of filaments. For example, in one embodiment, the first laser 13 may require at least a kW. Pulse rate will depend on the required duty cycle, up to MHz. In method 10, high pulse rates may be desirable to achieve suitable duty cycles.

LOS propagation is principally employed for high frequency communication. Ionized trails (filamentation) in the air may be created by using pulsed lasers. These plasma filaments can extend for hundreds of meters and can occur kilometers from the source. Free-electron densities of up to $10^{18}/cm^3$ may be achieved, which is many orders of magnitude greater than the real ionosphere, which has a free-electron density of up to $10^6/cm^3$. For example, the first ion plasma reflector 18 may have a free-electron density of approximately $10^{15}/cm^3$. Although the aforementioned plasma filaments decay rapidly in the lower atmosphere, they last sufficiently long to serve as RF wave reflectors. The ionization plasma filaments may be refreshed on a microsecond time scale to allow the plasma reflector 18 to persist in the open air 22. The physical effects are dynamically non-linear, have been theoretically modeled, and have been numerically simulated to at least qualitative accuracy and experimental validation.

The laser pulses 16 may be any type of laser pulses with enough power to produce very high, very localized energy densities to invoke the Kerr effect and start the self-sustaining focusing/defocusing-chain. Suitable examples of the energy pulses include, but are not limited to, high frequency femtosecond, and UV frequency laser pulses. The surface pattern forming the reflector 18 may be produced by a combination of two or more laser pulses and two or more frequencies.

Figures 4A, 4B, 4C, 4D:
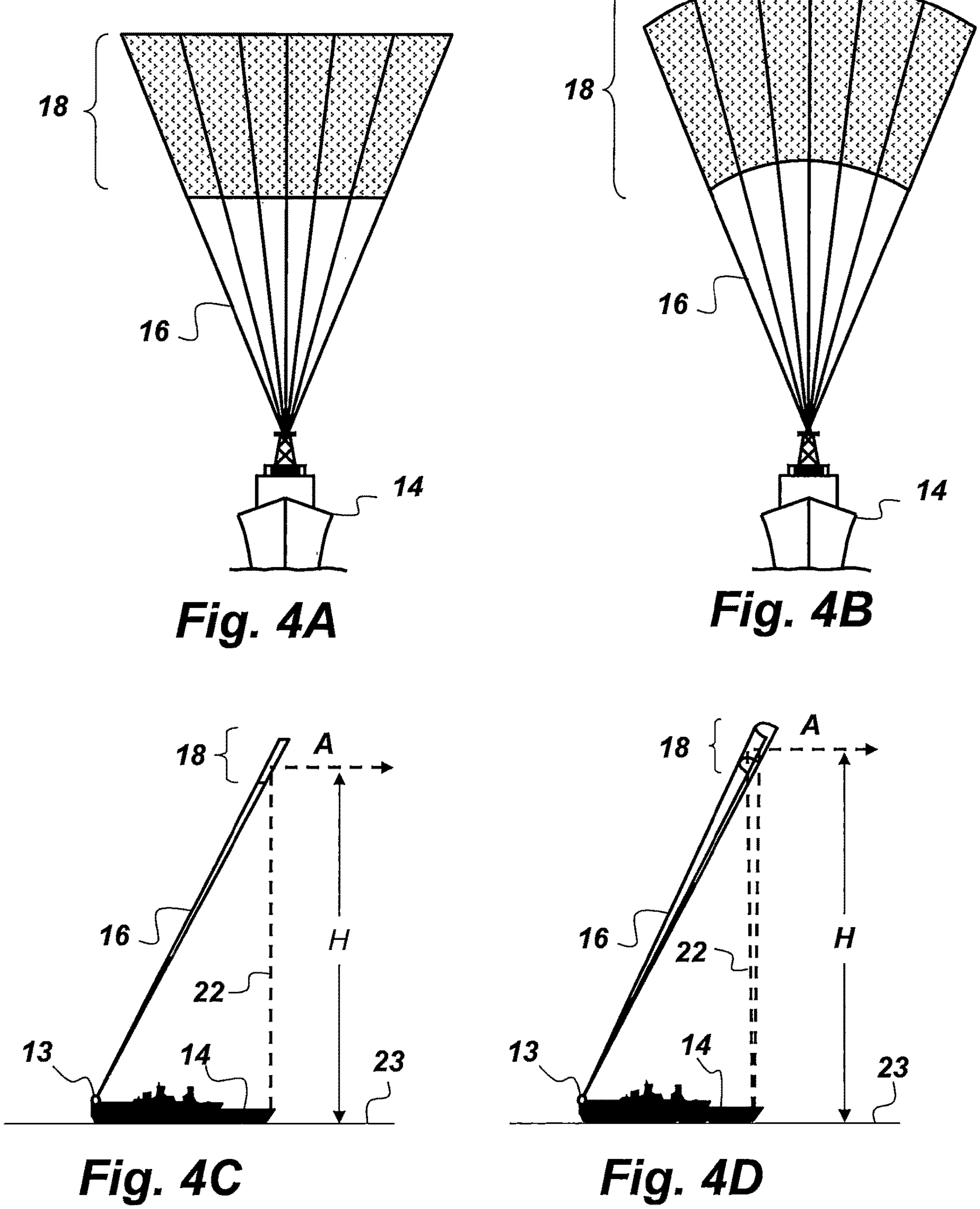
FIGS. 4A-4D are illustrations showing different embodiments of a laser-induced ionospheric plasma reflector.

FIGS. 4A-4D are illustrations showing different embodiments of the reflector 18. FIGS. 4A and 4C are respectively a front view and a side view of a flat plane embodiment of the reflector 18. FIGS. 4B and 4D are respectively a front view and a side view of a curved embodiment of the reflector 18. It is to be understood that the size and shape of the surface pattern that forms the reflector 18 is not limited to the patterns shown in FIGS. 4A-4D, but that the reflector 18 may take the form of any conically extruded shape. The laser pulses 16 may be aimed so as to create the first reflector 18 at location A that is H meters above a surface 23. For example, in one embodiment, the surface 23 is an ocean surface and the first location A is approximately 100 meters above the surface 23.

Figure 5:
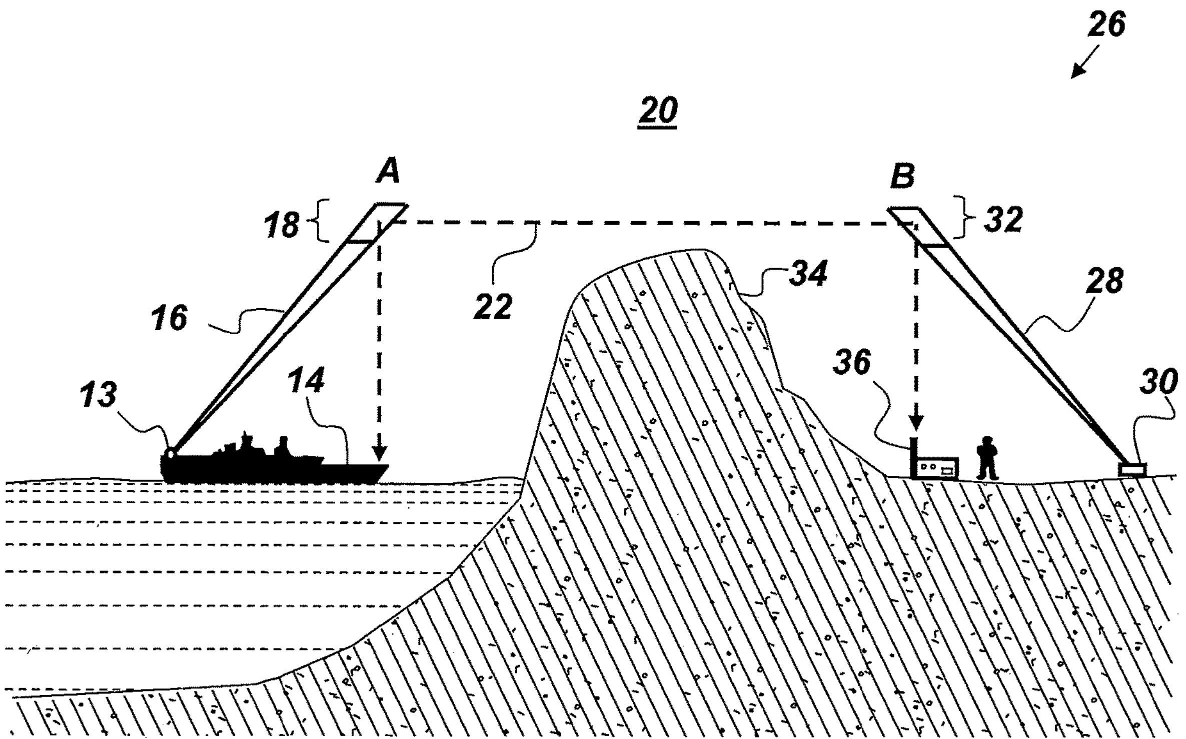
FIG. 5 is a side-view illustration of a dual-reflector communication system.

FIG. 5 is an illustration of a dual-reflector environment 26 in which an embodiment of the communication method 10 may be employed. In environment 26, method 10 uses laser pulses 28 from a second laser 30 to produce a pattern of ionization filaments via the Kerr effect that serve as a second ion plasma reflector 32 in open air 20 at a second location B. The RF signals 22 may then be reflected between the first reflector 18 and the second reflector 32. Method 10 enables the RF communication over and/or around LOS obstacles such as the mountain 34 depicted in FIG. 3. Method 10 may be used for RF communications between the mobile platform 14 and a transceiver 36 even if the mobile platform 14 is located more than ten kilometers from the transceiver 36.

The first and second lasers may be any lasers capable of creating the ionized filaments necessary to form an artificial ionospheric, atmospheric reflector such as the first reflector 18. The receiver 24 may be any RF receiver capable of receiving the RF signals 22. The mobile platform 14 may be any mobile platform capable of supporting the first laser 13. Suitable examples of the mobile platform 14 include, but are not limited to, a ship, a barge, a submersible, a buoy, a towed platform, an aircraft, and a land-based vehicle. It is to be understood, that method 10 may be used to enable communications between fixed locations as well. A mobile platform is not necessary to practice method 10.

Figure 6:
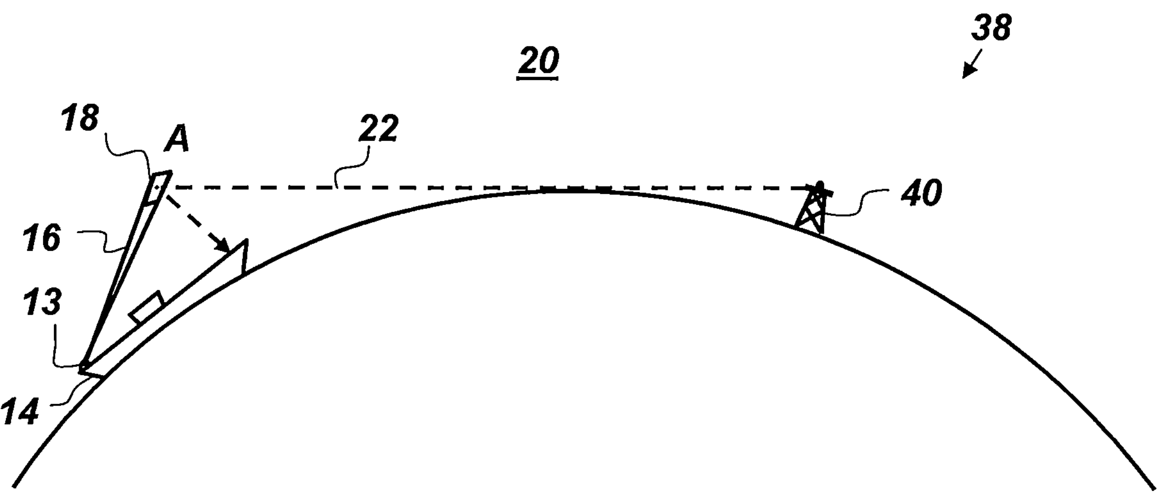
FIG. 6 is a side-view illustration of an operational environment where RF transmissions are reflected off of a plasma reflector.

FIG. 6 is an illustration of an operational environment 38 where RF transmissions 22 originate from a transmitter 40 that is located beyond the horizon from the mobile platform 14, are reflected off of the first reflector 18, and are then received by the mobile platform 14. This embodiment allows the mobile platform 14 to receive RF signals from beyond the horizon.

Figure 7:
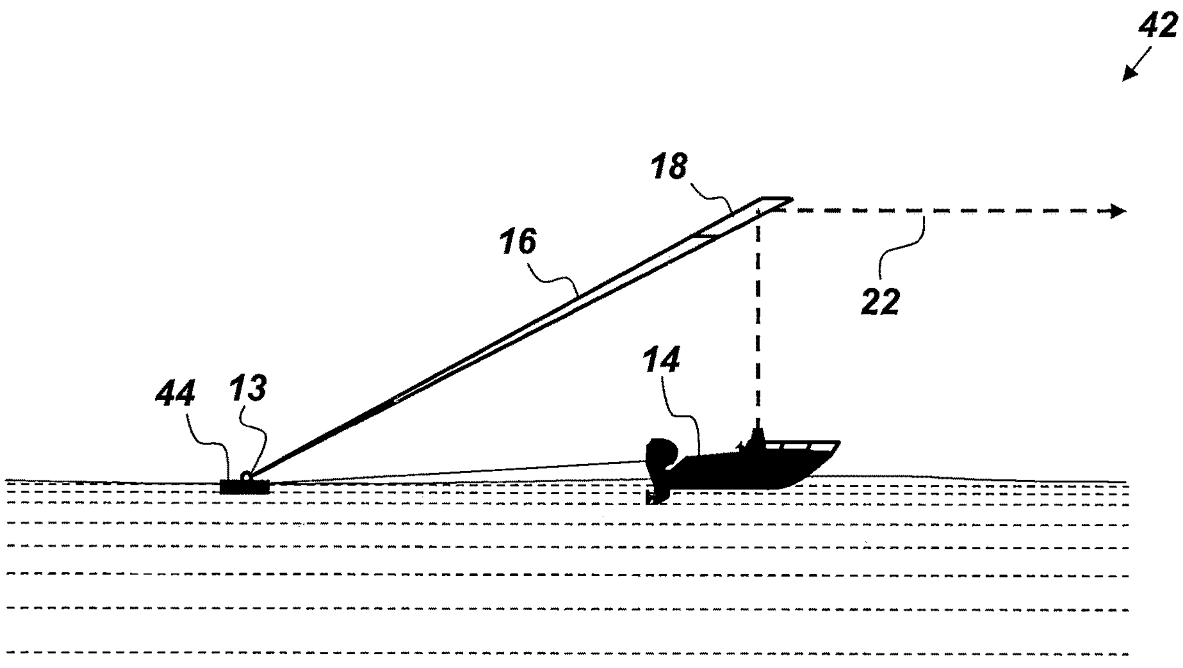
FIG. 7 is a side-view illustration of dual platform operational environment utilizing a laser-induced ionospheric plasma reflector.

FIG. 7 is an illustration of an operational environment 42 where the laser pulses 16 originate from a separate platform from the RF signals 22. The first laser 13 is mounted to a second mobile platform 44 and the RF signals 22 originate from the mobile platform 14. While the second mobile platform 44 is depicted in FIG. 7 as a towed platform, it is to be understood that the second mobile platform 44 is not so limited, but may be any platform capable of supporting the first laser 16.

Figure 8:
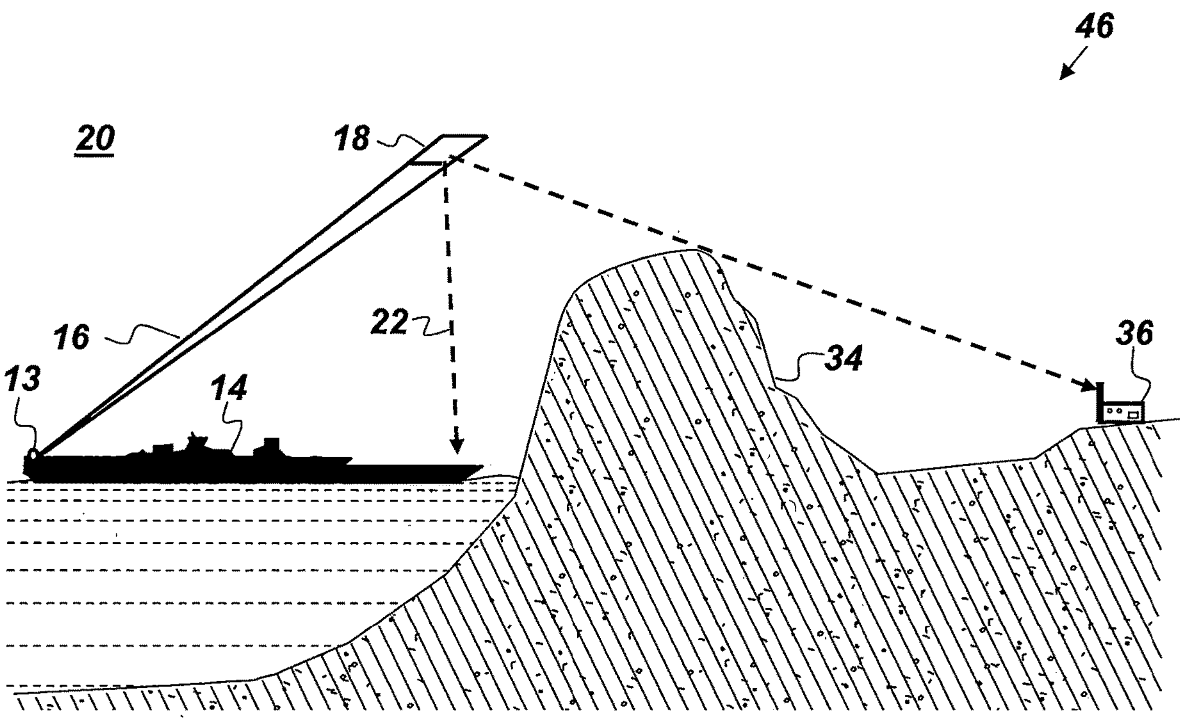
FIG. 8 is a side-view illustration of an operational environment utilizing a laser-induced ionospheric plasma reflector to avoid an obstacle.

FIG. 8 is an illustration of an operational environment 46 where the RF signals 22 are communication signals and the first ion plasma reflector 18 is positioned so as to deflect the incoming communications signals to avoid an LOS obstacle 34. The RF signals 22 may originate from and/or be received by the mobile platform 14. In this embodiment, the mobile platform 14 is an ocean vessel and the first location A is approximately 100 meters above the ocean surface. Method 10 may also be used to reflect RF signals originating from over the horizon such that the RF signals may be received by a receiver located on the mobile platform 14.

The origination point of the RF signals 22 and the laser 13 should be physically separated so as to allow the RF signals 22 to reflect off of the plasma reflector 18. For example, if both the laser 22 and a transceiver are on the same ship they could be mounted at opposite ends of the ship.

Figure 9:
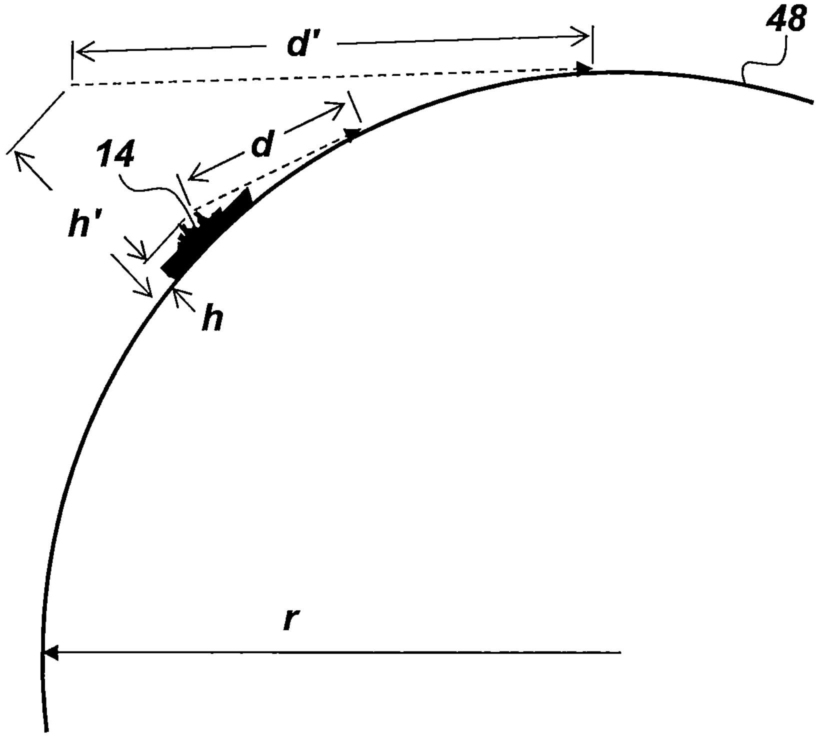
FIG. 9 is a side-view illustration of a mobile platform on a curved surface.

FIG. 9 is an illustration of a mobile platform 14, which is depicted as a ship in FIG. 9, on the curved surface of the earth 49. The effective communication distance d for a LOS transmitter on the curved surface can be calculated. If the antenna for the ship is at height h, the LOS distance d is limited by the curvature of the earth. This LOS communication distance d can be expressed as equation 1, where distance (d) is a function of radius (r) of earth and combined height (h) of the ship's antenna and the source of the RF signals received by the antenna, which source is shown as being at sea level in FIG. 9.

$$d=\sqrt{2rh+h^2}\approx\sqrt{2rh} \tag{1}$$

Using Equation 1, it can be seen that a receiver placed at a 10 m height can detect an object on the earth's surface at 11.3 km distance. From FIG. 9, it can be seen that if height h of an antenna can be extended to height h' the LOS communication distance d can be increased to d'. For example, if the height is increased to 100 meters (i.e., h'=100 m) then the LOS communication distance d' would be 35.7 km. Similarly, an antenna at height h=1 km can receive RF transmissions originating as far away as 112.9 km. An artificial, transient, atmospheric reflector, such as the plasma reflector 18 enables increased communication ranges by effectively increasing the height of the antenna.

Figure 10:
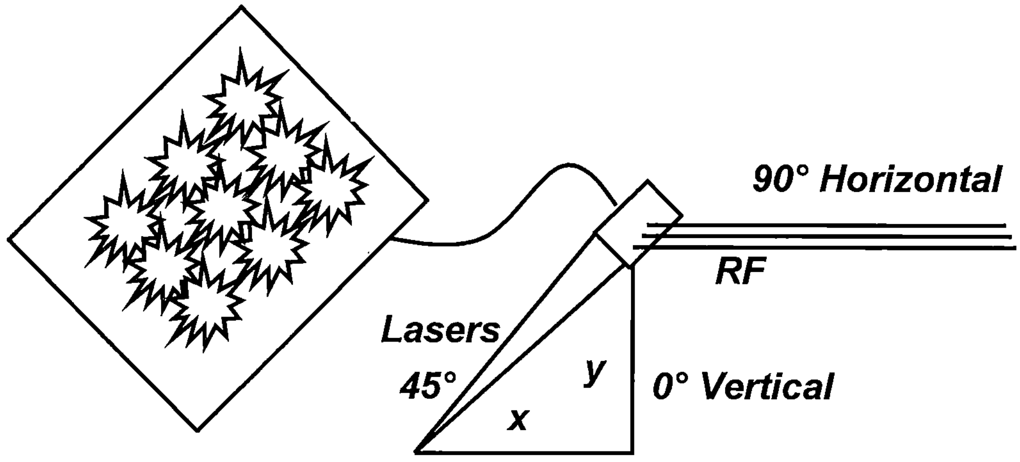
FIG. 10 is an illustration depicting a virtual communication reflector created by laser-induced atmosphere ionization.

FIG. 10 is an illustration depicting a virtual communication reflector created by laser atmosphere ionization. As shown in FIG. 10, the Kerr effect enables 1) formation of an ion plane and 2) extended propagation ranges. An embodiment of method 10 uses high frequency femtosecond lasers to reduce the energy required to ionize the atmosphere. High frequency lasers have high peak energy and nonlinear properties of ion formation. Method 10 may be used in both transmit and receive modes using an ionization plane. The lasers are pulsed so that the max energies are well into non-linear domains. In particular, free-electron plasmas can be created at densities many orders of magnitude greater than the real ionosphere. Method 10 could be extended to other medias and application domains. For example, method 10 has potential for various spin-offs, such as virtual antennae for moving air platforms: in-flight not needing a virtual reflector, enhanced in-field communications, reduced physical-antenna profiles, etc.

Figure 11:
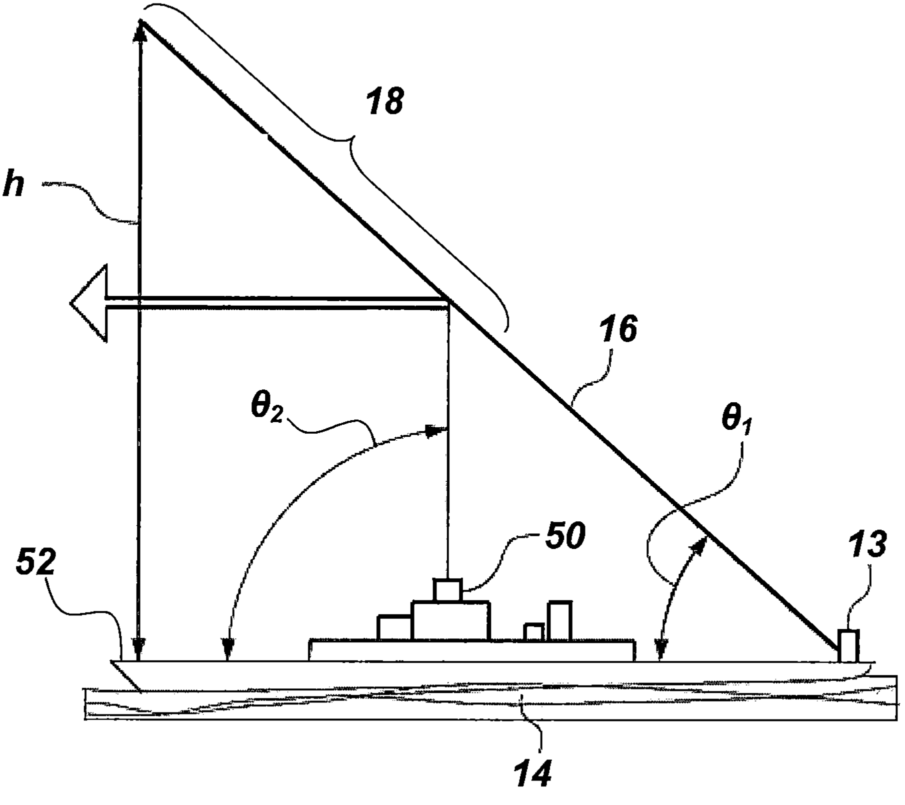
FIG. 11 is a side-view illustration of a mobile platform generating a plasma reflector.

FIG. 11 is an illustration of a ship embodiment of the mobile platform 14, which generates the plasma reflector 18.

As shown in FIG. 11, the first laser 13 can establish the 1st plasma reflector 18 at angle $\theta_1$ from the horizontal of between zero and ninety degrees ($0° < \theta_1 < 90°$). Typically, $\theta_1$ can be about 45°. A plurality of lasersl3 could be used to establish the reflective surface pattern composing the plasma reflector 18 which functions as an artificial ionosphere. Alternatively, the first laser 13 could be dithered to establish a transient ionospheric, reflective surface in several embodiments. Communication method 10 may employ an antenna 50 for transmitting and receiving RF energy. To maximize the use of the plasma reflector 18, the antenna 50 can be oriented to transmit and/or receive RF energy at an angle $\theta_2$ from the horizontal of between forty-five and one hundred thirty-five degrees ($45° < \theta_2 < 135°$). Typically, $\theta_2$ can be about 90°, as shown in FIG. 11. For shipboard embodiments, antenna 50 can usually be located amidships at the highest point on the ship, as also depicted in FIG. 11. This is because the antenna is usually radiating RF energy horizontally, which can pose a hazard to shipboard personnel. But with method 10 the antenna 50 radiates vertically upward (at $\theta_2 = 90°$). As such, the antenna 50 could be placed at the forward-most portion of ship, at the forecastle 52. This increases the height h of effective transmission of RF energy as shown in FIG. 11, which would further increase the LOS communication range of the antenna 50 over the horizon according to Equation (1), as described above.

Figure 12:
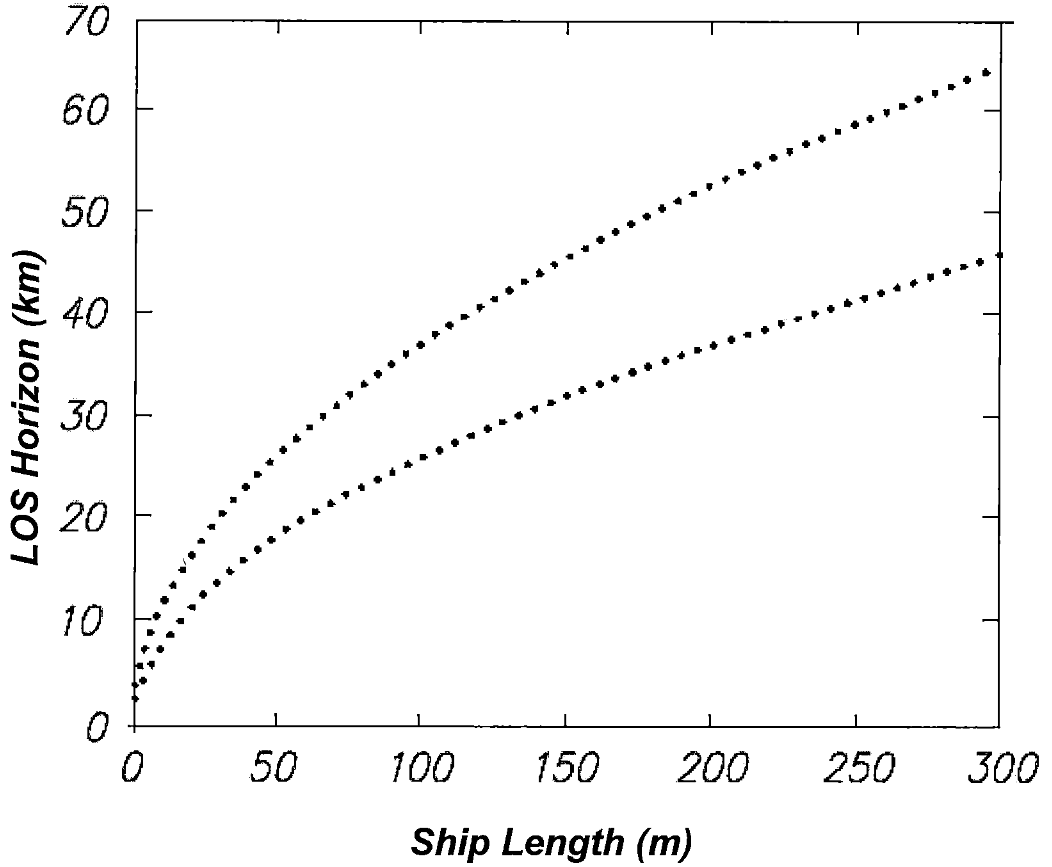
FIG. 12 is a graph plotting a communication horizon with respect to a separation distance between a laser and an antenna.

FIG. 12 is a graph of separation distance between the laser 13 (oriented at $\theta_1$) and antenna 50 (oriented to operate at $\theta_2$) for the embodiment shown in FIG. 11. From FIG. 12, it can be appreciated that for a ship having a length of 200 m, placing the laser 13 and antenna 50 at the extreme fore and aft locations on ship can increase the LOS communication horizon by dozens of kilometers. For several embodiments, the capability of and the full potential can be realized, by inducing the artificial ionosphere (i.e., plasma reflector 18) up to a kilometer or two above the ship, and placing the laser 13 and antenna 50 in different ships that are travelling in a convoy or formation (such as depicted in FIG. 7).

The use of the terms “a” and “an” and “the” and similar references in the context of describing the invention (especially in the context of the following claims) is to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All method steps described herein can be performed in any suitable order unless otherwise indicated herein or otherwise clearly contradicted by context. The use of any and all examples, or exemplary language (e.g., “such as”) provided herein, is intended merely to better illuminate the invention and does not pose a limitation on the scope of the invention unless otherwise claimed. No language in the specification should be construed as indicating any non-claimed element as essential to the practice of the invention.

From the above description of the communication method 10, it is manifest that various techniques may be used for implementing the concepts of method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that method 10 is not limited to the particular embodiments described herein, but is capable of many embodiments without departing from the scope of the claims.

We claim:

1. A method comprising the steps of:

using laser pulses from a first laser to produce a first surface pattern of ionization filaments that serve as a first ion plasma reflector in open air at a first location; and reflecting radio frequency (RF) signals off of the first ion plasma reflector;

using laser pulses from a second laser to produce a second surface pattern of ionization filaments via the Kerr effect that serve as a second ion plasma reflector in open air at a second location that is remote from the first location; and reflecting the RF signals that were reflected off the first ion plasma reflector off of the second ion plasma reflector.

2. The method of claim 1, wherein the laser pulses are high frequency femtosecond laser pulses.

3. The method of claim 1, wherein the laser pulses are low frequency ultraviolet (UV) laser pulses.

4. The method of claim 1, wherein the first surface pattern is produced by a combination of two or more laser pulses and two or more frequencies.

5. The method of claim 1, wherein the shape of the first ion plasma reflector is approximately a flat plane.

6. The method of claim 1, wherein the shape of the first ion plasma reflector is approximately a curved surface.

7. The method of claim 1, wherein the RF signals originate from a transmitter, and wherein the RF signals are reflected off of the first ion plasma reflector in a direction that is approximately parallel to the earth’s surface.

8. The method of claim 7, further comprising the steps of:

reflecting the reflected RF signals off of the second ion plasma reflector to a receiver that is located more than ten kilometers from the transmitter.

9. The method of claim 7, wherein both the RF signals and the laser pulses from the first laser, originate from a same mobile platform.

10. The method of claim 9, wherein the mobile platform is a surface ship.

11. The method of claim 1, wherein the reflected RF signals originate from beyond a horizon from where the first laser is located.

12. The method of claim 1, wherein the RF signals are communication signals and the first ion plasma reflector is positioned so as to deflect the incoming communications signals to avoid a line-of-sight (LOS) obstacle.

13. The method of claim 1, wherein the RF signals are sensor signals and the first ion plasma reflector is positioned so as to deflect incoming sensor signals around a line-of-sight (LOS) obstacle.

14. The method of claim 1, wherein the first ion plasma reflector has a free-electron density of approximately $10^{15}/cm^3$.

15. The method of claim 1, further comprising the step of refreshing the ionization filaments on a microsecond time scale.

16. A method comprising the steps of:

using a first laser array mounted on a first platform to generate a first series of femtosecond laser pulses such that each laser pulse creates an ionization filament according to the Kerr effect in open air;

aiming the first laser array such that the ionization filaments form a first ion plasma reflector in open air at a first location such that the first ion plasma reflector has a free-electron density of approximately $10^{15}/cm^3$;

reflecting high frequency radio frequency (RF) signals off of the first ion plasma reflector;

using a second laser array that is beyond the horizon from the first platform to generate a second series of femtosecond laser pulses such that each laser pulse of the second laser array creates an ionization filament according to the Kerr effect in open air;

aiming the second laser array such that the ionization filaments form a second ion plasma reflector in open air at a second location such that the second ion plasma reflector has a free-electron density of approximately $10^{15}/cm^3$;

further reflecting the RF signals that were reflected off the first ion plasma reflector off of the second ion plasma reflector such that the RF signals are directed toward a receiver mounted to a second platform, and;

receiving the reflected RF signals with the receiver.

17. The method of claim 16, wherein the second platform is physically located beyond a horizon from the first platform.

18. The method of claim 16, wherein the second laser array and the receiver are both mounted to the second platform and the RF signals originate from a location beyond a horizon from the second platform.

19. The method of claim 18, wherein the second platform is an ocean vessel and the second location is approximately 100 meters above an ocean surface.

* * * * *